United States Patent
Imai et al.

[11] Patent Number: 6,147,319
[45] Date of Patent: Nov. 14, 2000

[54] HOLE MAKING DEVICE FOR WEB MATERIAL

[75] Inventors: Kiyoshi Imai; Junichi Fukuchi; Michiaki Takatsu, all of Tokyo, Japan

[73] Assignee: Japan Tobacco Inc.

[21] Appl. No.: 09/171,876

[22] PCT Filed: Mar. 4, 1998

[86] PCT No.: PCT/JP98/00890

§ 371 Date: Oct. 28, 1998

§ 102(e) Date: Oct. 28, 1998

[87] PCT Pub. No.: WO98/39135

PCT Pub. Date: Sep. 11, 1998

[30] Foreign Application Priority Data

Mar. 5, 1997 [JP] Japan .................................. 9-050582

[51] Int. Cl.[7] .......................... B23K 26/00; B23K 26/10; A24C 5/14; A24D 3/02
[52] U.S. Cl. ................... 219/121.62; 219/121.7; 131/281
[58] Field of Search ................ 219/121.7, 121.71, 219/121.76, 121.62; 131/281

[56] References Cited

U.S. PATENT DOCUMENTS

| | | | |
|---|---|---|---|
| 3,226,527 | 12/1965 | Harding ................................ | 219/131.7 |
| 4,121,595 | 10/1978 | Heitmann et al. ................ | 219/121.7 X |
| 4,297,559 | 10/1981 | Whitman, III ..................... | 219/121.62 |
| 4,507,535 | 3/1985 | Bennett et al. ..................... | 219/121.71 |
| 4,672,168 | 6/1987 | Saunders et al. .................... | 219/121.7 |
| 5,092,350 | 3/1992 | Arthur et al. ......................... | 131/281 |
| 5,259,401 | 11/1993 | Lange et al. .......................... | 131/281 |
| 5,341,824 | 8/1994 | Fletcher et al. ....................... | 131/281 |
| 5,367,144 | 11/1994 | Matsumura et al. ............ | 219/121.7 X |
| 5,595,196 | 1/1997 | Salonen et al. ........................ | 131/362 |

FOREIGN PATENT DOCUMENTS

| | | |
|---|---|---|
| 2-0594122 | 4/1994 | European Pat. Off. . |
| 1-0625476 | 11/1994 | European Pat. Off. . |
| 54-74592 | 6/1979 | Japan . |
| 61-20683 | 1/1986 | Japan ............................... 219/121.71 |
| 61-20686 | 1/1986 | Japan . |
| 5-138381 | 6/1993 | Japan . |
| 6-129886 | 5/1994 | Japan . |
| 6-286738 | 10/1994 | Japan . |

Primary Examiner—Samuel M. Heinrich

[57] ABSTRACT

A perforating device for web material comprises a plurality of laser heads for emitting pulse laser beams toward the web traveling at constant speed and a plurality of linear actuators for individually supporting the laser heads, moving the laser heads independently in the width direction of the web, and determining positions for the application of the pulse laser beams.

13 Claims, 5 Drawing Sheets

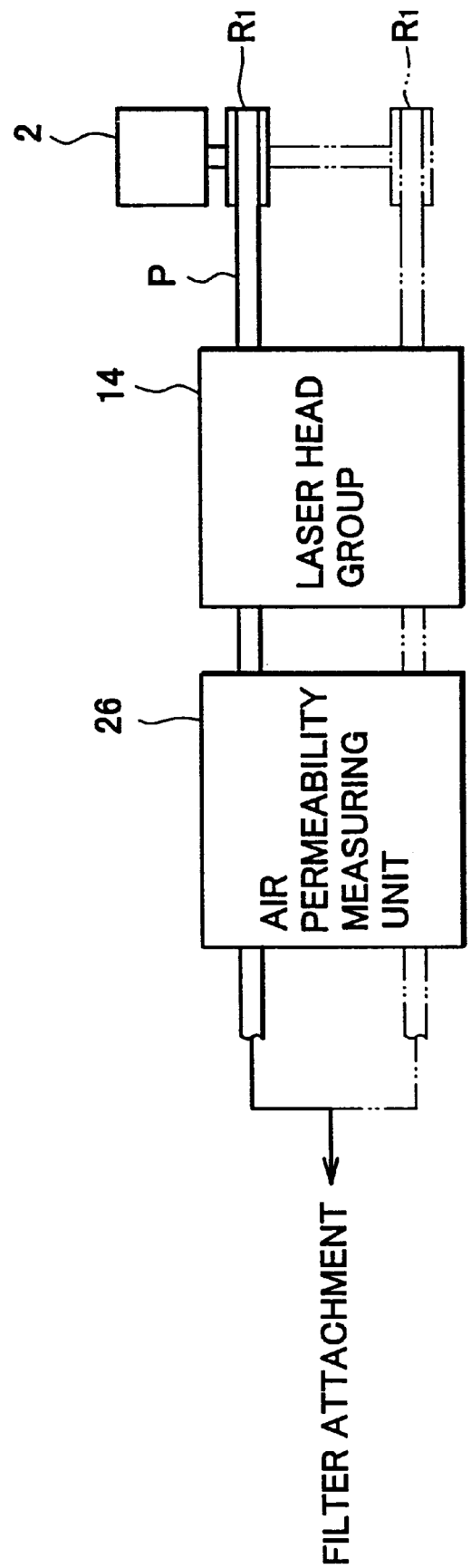

1

HOLE MAKING DEVICE FOR WEB MATERIAL

This application is the national phase under 35 U.S.C. §371 of prior PCT International Application No. PCT/JP98/00890 which has an International filing date of Mar. 4, 1998 which designated the United States of America, the entire contents of which are hereby incorporated by reference.

TECHNICAL FIELD

The present invention relates to a perforating device for forming a web material with pores at regular intervals in the longitudinal direction of the web material, in particular to a perforating device adapted to the formation of pores in a tip paper web used in the manufacture of filter cigarettes.

BACKGROUND ART

A perforating device of this type is disclosed in Jpn. Pat. Appln. KOKAI Publication No. 5-138381, for example. The device of this publication includes a source of laser generation. The source of laser generation emits a laser beam continuously. The emitted laser beam is applied to a polygonal mirror in a rotating state. As the polygonal mirror rotates, it cyclically deflects the applied laser beam and converts it into a pulse laser beam. The pulse laser beam is divided into a plurality of beam segments through an optical system, and these beam segments are applied to a tip paper web for use as a web material. While this is done, the tip paper web is traveling, so that the beam segments form a plurality of rows of pores in the tip paper web. Thereafter, the tip paper web is cut to provide a tip paper piece with a given length in a filter attachment, and the tip paper piece is used to connect two cigarettes and a filter plug, whereby a double filter cigarette is manufactured. The double filter cigarette is cut in the center of the tip paper piece, whereupon individual filter cigarettes are obtained.

The perforating device described above has an advantage in being able to form a plurality of rows of pores in the tip paper web by using only the single source of laser generation.

However, the perforating device cannot easily cope with change of the type of the tip paper web. More specifically, the types of tip paper webs used in the manufacture of filter cigarettes, that is, the numbers and positions of rows of pores, vary depending on the brands of the filter cigarettes to be manufactured. The optical system should be changed in order to form tip paper webs with pores that vary in row number and row position. Changing the optical system requires adjustment of paths through which the beam segments are to pass. The replacement of the optical system and the adjustment of the paths. take much labor and time.

More specifically, the optical system of the disclosed perforating device includes a bisecting mirror. The bisecting mirror divides the pulse laser beam into two beam segments, and these beam segments form a row of pores on each of the left- and right-hand side portions of a tip paper web. It is very difficult, however, to make adjustment to guide the beam segments, divided by the bisecting mirror, to the tip paper web with the respective generation cycles and intensities of the beam segments kept equal. Therefore, the pores in each row are subject to variations in size and intervals, so that target air permeability cannot be given accurately to the tip paper web. In consequence, the quality of the filter cigarettes cannot be maintained with high accuracy.

SUMMARY OF THE INVENTION

The object of the present invention is to provide a perforating device, in which the number and position of rows of pores to be formed in a web material can be changed with ease, and the air permeability of the web material can be maintained with high accuracy.

A perforating device for web material according to the present invention comprises running means for running a web material at a constant speed along a predetermined path of travel, and laser beam generating means for emitting a plurality of pulse laser beams toward the web material on the path of travel, thereby forming a plurality of rows of pores in the web material. The laser beam generating means includes a plurality of laser heads for emitting the pulse laser beams, and moving means for moving each laser head independently in the width direction of the web material.

According to the perforating device of the invention, the laser heads to be used are selected in accordance with the number of rows of pores to be formed in the web material. The selected laser heads are moved in the width direction of the web material by the moving means, and positions for the application of the pulse laser beams to the web material are determined. In consequence, a desired number of rows of pores are formed in desired positions in the web material.

The perforating device may further comprise varying means for varying the size of each pore to be formed in the web material. In this case, the varying means includes measuring means for measuring the actual air permeability per unit length of the web material having the rows of pores formed therein, comparing means for comparing the measured actual air permeability and a target air permeability and outputting a deviation between these air permeabilities, and control means for controlling the emission of the pulse laser beams from active laser heads in accordance with the deviation. More specifically, the control means controls the pulse width and/or intensity of the laser beams with the emission cycle of the pulse laser beams kept constant.

In the case where the actual air permeability of the web material is lower than the target air permeability, the pulse width and/or intensity of the pulse laser beams is increased, so that the formed pores are enlarged. In the case where the actual air permeability of the web material is higher than the target air permeability, on the other hand, the pulse width and/or intensity of the pulse laser beams is reduced, so that the formed pores are reduced in size.

The web material is a web of tip paper used in the manufacture of filter cigarettes. In this case, the resistance-to-draw of the filter cigarettes manufactured using the tip paper is controled with high accuracy.

The running means may include a roll for delivering the web of the tip paper and take-up means for winding up the web fed from the roll and formed with the rows of pores by the laser generating means.

The take-up means may include slitting means for slitting the web to form a plurality of narrow webs each having rows of pores and take-up bobbins for winding up the individual narrow webs. In this case, the productivity for the tip paper having the rows of pores is improved.

The running means may include a roll for delivering the web and a path of travel for guiding the web, fed from the roll and formed with the rows of pores by the laser generating means, directly to a manufacturing apparatus for filter cigarettes. In this case, the filter cigarettes can be manufactured subsequently to the formation of the pores in the tip paper. In this case, the productivity for the filter cigarettes can be further improved if the running means includes a pair of rolls and a pair of paths of travel.

BRIEF DESCRIPTION OF THE DRAWINGS

FIG. 6 is a schematic view showing a perforating device incorporated on-line in a filter attachment.

BEST MODE FOR CARRYING OUT THE INVENTION

Figure 1:
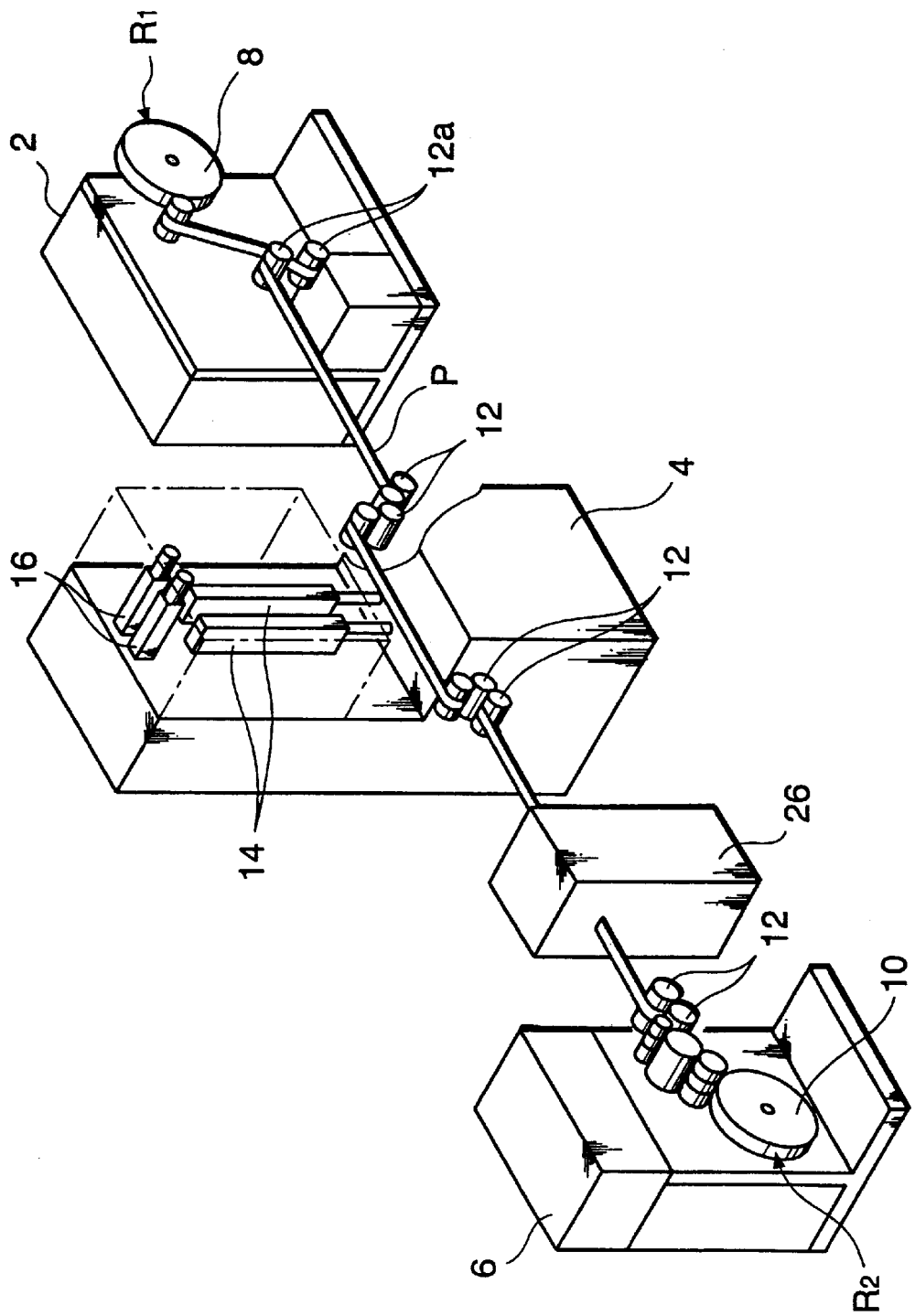
FIG. 1 is a schematic view showing a single-type perforating device.

Referring to FIG. 1, a laser perforating device roughly comprises a feed unit 2 for a single web P of tip paper used in the manufacture of filter cigarettes, a take-up unit 6 for the single web P, and a perforating unit 4 between these units 2 and 6. These units 2, 4 and 6 are arranged on the same line. The feed unit 2 has a horizontal rotating shaft, and this rotating shaft is fitted with a roll $R_1$ of the single web P by means of a feed bobbin 8. The take-up unit 6 also has a horizontal rotating shaft, and this rotating shaft is fitted with a take-up bobbin 10.

Further, the feed unit 2, perforating unit 4, and the take-up unit 6 are provided with a plurality of guide rollers 12. The single web P delivered from the roll $R_1$ is guided by the guide rollers 12 as it passes through the perforating unit 4, and is led to the bobbin 10 of the take-up unit 6. The guide rollers 12 define a path of travel of the single web P. Moreover, a pair of guide rollers 12a among the guide rollers 12 of the feed unit 2, correct meandering of the single web P.

The rotating shaft of the take-up unit 6 is connected with an electric motor by means of a powder clutch, and the rotating shaft of the feed unit 2 is also connected with a powder brake. The powder brake and the electric motor are not shown in FIG. 1. When the electric motor is driven, the take-up bobbin 10 rotates in one direction. This rotation causes the single web P to be delivered from the roll $R_1$. The delivered single web P passes through the perforating unit 4 and is wound on the bobbin 10 of the take-up unit 6, whereupon it forms a take-up roll $R_2$. The speed of the single web P traveling from the roll $R_1$ toward the take-up bobbin 10 is constant. The delivery tension of the single web P is kept fixed by the powder brake, and the take-up tension of the single web P is also kept fixed by the powder clutch.

The perforating unit 4 is provided with, for example, two laser heads 14. These laser heads 14 are located above the path of travel of the single web P. The laser heads 14 emit pulse laser beams toward the single web P on the path of travel. The two laser heads 14 are arranged adjacent to each other along the path of travel of the single web P. and are supported by linear actuators 16, individually. These linear actuators 16 can cause their corresponding laser heads 14 to move in the width direction of the single web P on the path of travel. Thus, the two laser heads 14 are arranged at equal distances from the centerline of the single web P as viewed in the width direction of the single web P.

Figure 2:
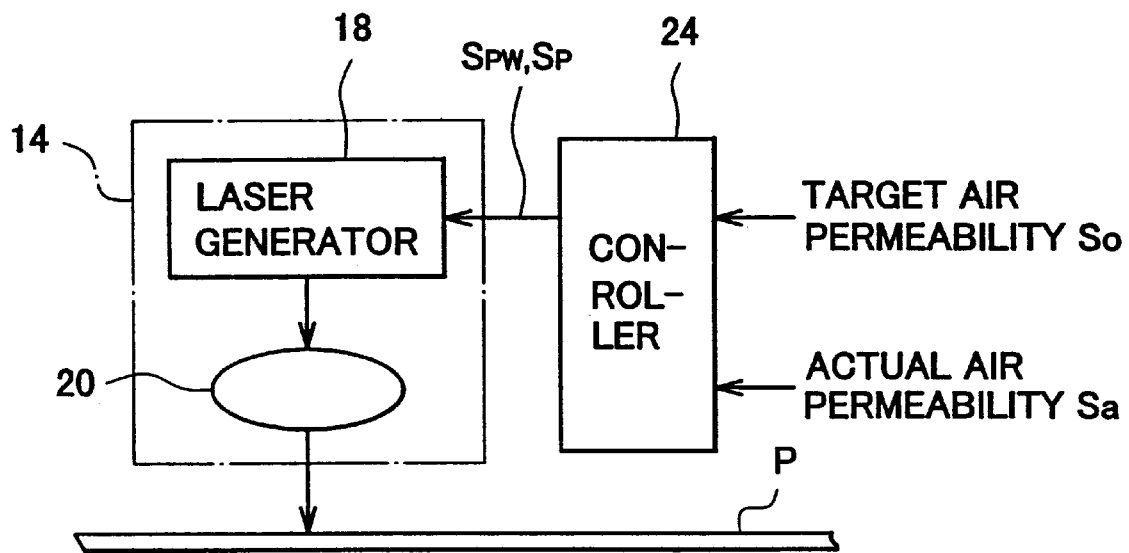
FIG. 2 is a view showing an outline of a laser head.
Figure 3:
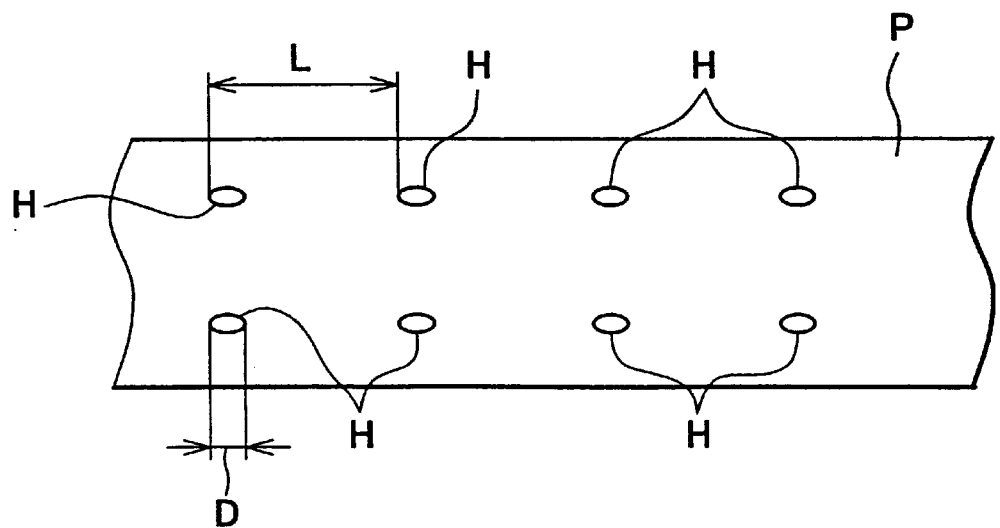
FIG. 3 is a view partially showing rows of pores formed in a tip paper web.

As shown in FIG. 2, each laser head 14 includes a carbon-dioxide-gas laser generator 18 and a condensing lens 20, the laser generator 18 being connected electrically to a controller 24. The laser generator 18 emits laser beams at regular intervals, and these pulse laser beams are transmitted through the condensing lens 20 and applied to the single web P. If the single web P then travels at the constant speed, pores H are formed in two rows in the single web P. as shown in FIG. 3. Intervals L between the pores H in each row are determined depending on the cycle of emission of the pulse laser beams. The size of each pore H is determined by the intensity or power of the pulse laser beams, as well as by the effective pulse width thereof. The perforating unit 4 has a dust collector (not shown) built-in. The dust collector seizes dust and smoke that are generated from the single web P during laser perforation.

The effective pulse width and intensity of the pulse laser beams are controlled by means of the controller 24. More specifically, the controller 24 supplies the laser generator 18 with signals for controlling the effective pulse width and intensity. In consequence, the size of the pores H in each row is controlled so that an actual air permeability Sa of the single web P is equal to a target air permeability So.

Figure 4:
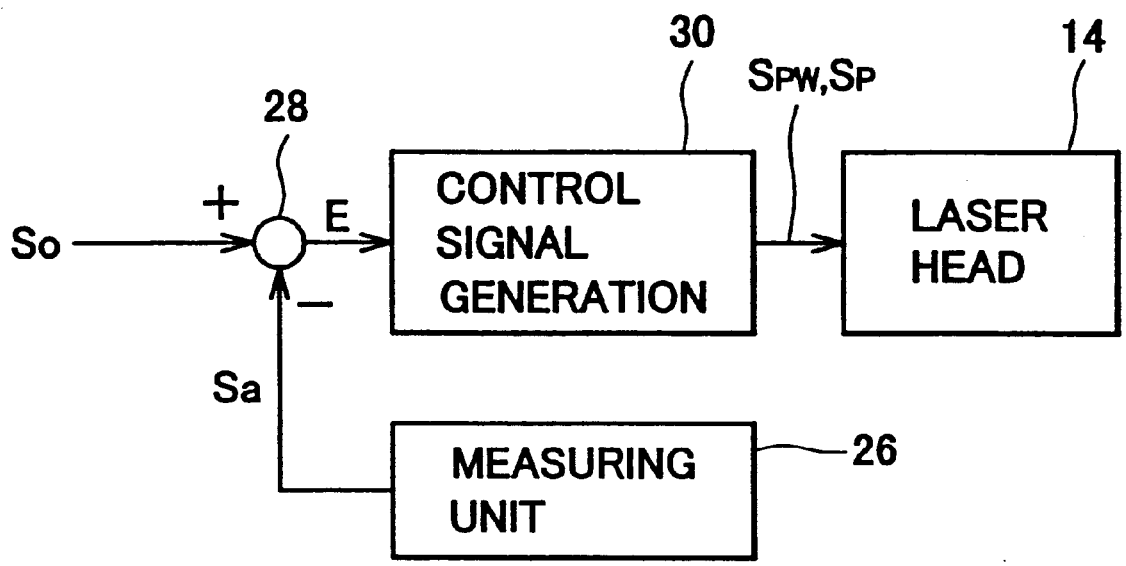
FIG. 4 is a block diagram for illustrating the function of a controller for controlling the laser head.

More specifically, a measuring unit 26 is arranged between the perforating unit 4 and the take-up unit 6, as shown in FIG. 1. Thus, after the single web P having passed through the perforating unit 4 passes through the measuring unit 26, it is guided to the take-up bobbin 10. The measuring unit 26 measures the actual air permeability Sa per unit area of the single web P passing therein, and supplies the measurement result to the controller 24. In the controller 24, as shown in FIG. 4, a deviation E between the target air permeability So and the actual air permeability Sa is calculated by a subtracter 28, and the deviation E is supplied to an arithmetic logical unit 30. The arithmetic logical unit 30 generates control signals $S_{pw}$ and $S_p$ in accordance with the deviation E, and supplies these control signals to the laser generator 18 of each laser head 14. Based on the control signals $S_{pw}$ and $S_p$, therefore, each laser head 14 can emit laser beams, thereby forming a desired row of pores H in the single web P. In consequence, the actual air permeability Sa of the single web P becomes equal to the target air permeability So. More specifically, the controller 24 controls the effective pulse width of the pulse laser beams or the length of each pore H in accordance with the control signal $S_{pw}$ and controls the power of the pulse laser beams or a diameter D of each pore H in accordance with the control signal $S_p$. The controller 24 may also control the size of each pore H in accordance with at least one of the control signals $S_{pw}$ and $S_p$.

The perforated single web P wound on the take-up bobbin 10, along with the take-up bobbin 10, is removed in the form of the roll $R_2$ from the take-up unit 6. Thereafter, the roll of the single web P is set on a filter attachment and used in the manufacture of filter cigarettes.

Figure 5:
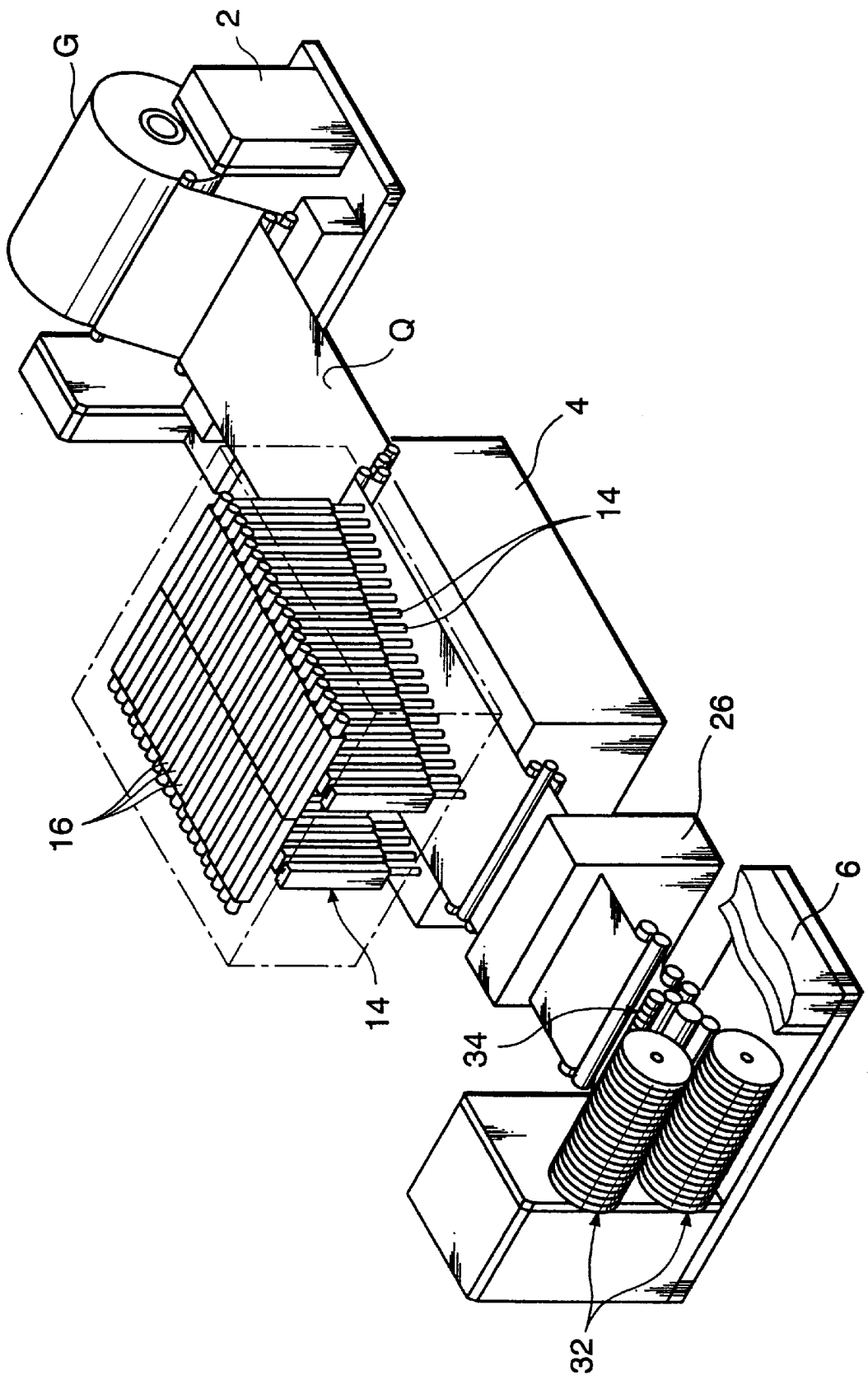
FIG. 5 is a schematic view showing a multi-type perforating device.

FIG. 5 shows a perforating device for forming pores H in a multi-web Q. The multi-web Q has a width greater enough than that of the single web P. In this case, a feed unit 2 is fitted with a roll G of the multi-web Q, while a take-up unit 4 is fitted with two take-up bobbin trains 32, upper and lower. Each take-up bobbin train 32 includes a plurality of take-up bobbins 10.

A slitter 34 is located on the upper-stream side of the take-up bobbin trains 32. The slitter 34 slits the multi-web Q, delivered from the roll G, into a plurality of single webs P. The individual slit single webs P are wound on their corresponding take-up bobbins 10. The slitter 34 includes a plurality of rotary knives. These rotary knives are arranged in a coaxial manner.

In the case of the perforating device of FIG. 5, a perforating unit 4 includes a large number of laser heads 14, and each laser head 14 is supported by a linear actuator 16. The laser heads 14 are arranged in two rows in the running direction of the multi-web Q. As viewed in the width direction of the multi-web Q, the individual laser heads 14 are located in positions different from one another.

The perforating device of FIG. 5 forms a plurality of rows of pores H in the multi-web Q. using selected laser heads 14. Thereafter, the multi-web Q is slit into individual single webs P by the slitter 34, each single web P having a desired number of rows of pores H.

FIG. 6 shows a perforating device of an on-line type. In this case, a single web P, having rows of pores H formed therein, is supplied directly to a rolling position in the filter attachment without being wound on a take-up bobbin 10. Arranged in the rolling position is a rolling plate, which serves to connect two cigarettes and a filter plug by means of a piece of tip paper, thereby forming a double filter cigarette.

In the case where the filter attachment has two rolling positions, a feed unit 2 is fitted with a pair of rolls $R_1$, as indicated by the two-dot broken line in FIG. 6. The single web P delivered from each roll $R_1$ is formed with pores H, and is then guided toward its corresponding rolling position in the filter attachment.

The present invention is not limited to the embodiments described above. For example, the measuring unit according to each embodiment measures the air permeability per unit length of the single web P or the multi-web Q. Alternatively, however, the measuring unit may be designed to measure the air permeability per unit length of a half web of the single web P or a half web in a region corresponding to each single web of the multi-web Q. In this case, the controller controls the pulse laser beam of the corresponding laser head in accordance with the measurement results.

What is claimed is:

1. A perforating device for web material, comprising:
   running means for continuously running a web material at a constant speed along a predetermined path of travel; and
   laser beam generating means for emitting a plurality of pulse laser beams linearly toward the web material on the path of travel, thereby forming a plurality of rows of pores in the web material, said laser beam generating means including a plurality of laser heads for emitting the pulse laser beams, each of the laser heads having a laser generator and a condensing lens, and moving means for linearly moving each laser head independently in a width direction of the web material.

2. The perforating device for web material according to claim 1, further comprising varying means for varying size of the pores to be formed in the web material.

3. The perforating device for web material according to claim 2, wherein said varying means includes measuring means for measuring an actual air permeability per unit length of the web material having the rows of pores formed therein, comparing means for comparing the measured actual air permeability and a target air permeability and outputting a deviation between the air permeabilities, and control means for controlling the emission of the pulse laser beams from active laser heads in accordance with the deviation.

4. The perforating device for web material according to claim 3, wherein said control means controls a pulse width of the laser beams with the emission cycle of the pulse laser beams kept constant.

5. The perforating device for web material according to claim 3, wherein said control means controls an intensity of the laser beams with the emission cycle of the pulse laser beams kept constant.

6. The perforating device for web material according to claim 3, wherein said control means controls both pulse width and intensity of the laser beams with the emission cycle of the pulse laser beams kept constant.

7. The perforating device for web material according to claim 1, wherein the web material is a web of tip paper used in the manufacture of filter cigarettes.

8. The perforating device for web material according to claim 7, wherein said running means includes a roll for delivering the web and take-up means for winding up the web fed from the roll and formed with the rows of pores by said laser generating means.

9. The perforating device for web material according to claim 8, wherein said take-up means includes slitting means for slitting the web to form a plurality of narrow webs each having rows of pores and take-up bobbins for winding up the individual narrow webs.

10. The perforating device for web material according to claim 7, wherein said running means includes a roll for delivering the web and a path of travel for guiding the web, fed from the roll and formed with the rows of pores by said laser generating means, directly to a manufacturing apparatus for filter cigarettes.

11. The perforating device for web material according to claim 10, wherein said running means includes a pair of the rolls and a pair of the paths of travel.

12. The perforating device for web material according to claim 3, further comprising arithmetic logical means, said arithmetic logical means being positioned between a subtractor of said control means and said laser beam generating means, said subtractor calculating a deviation signal based upon a target air permeability signal and an actual air permeability signal, wherein said deviation signal is communicated to said arithmetic logical means to thereby control said laser beam generating means.

13. The perforating device for web material according to claim 1, wherein said moving means is automatically controlled by a control means.

* * * * *